Patented Feb. 29, 1944

2,343,071

UNITED STATES PATENT OFFICE 2,343,071

AMINO FATTY ACID DERIVATIVES AND THEIR MANUFACTURE

Henry Martin, Kurt Glatthaar, and Walter Stammbach, Basel, Switzerland, assignors to the firm of J. R. Geigy A. G., Basel, Switzerland No Drawing. Application July 5, 1938, Serial No. 217,624. In Switzerland and Germany July 14, 1937

10 Claims. (Cl. 260—562)

This invention relates to an improvement in or modification of the process according to the U. S. Patents Nos. 2,153,707 and 2,139,190 and the U. S. patent application Ser. No. 188,203, filed February 1, 1938, for the manufacture of amino fatty acid derivatives.

In the aforesaid U. S. patents there are described processes for the manufacture of amino fatty acid derivatives, these being formed by reacting compounds of the general formula:

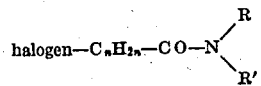

$n=1$, 2 or 3 having easily exchangeable halogen, with certain amines.

In the aforesaid U. S. Patent No. 2,153,707 these amines are primary, secondary or tertiary amines of aliphatic, araliphatic, hydroaromatic or aromatic nature, and in the case of secondary and tertiary amines these may be substituted by the same or different substituents, and when alkyl radicals are present they may contain hydroxyl groups and/or halogen atoms. Where secondary or tertiary bases are formed in this way, they may be further treated with the usual unsubstituted or halogen- and/or hydroxyl-substituted alkylating or aralkylating agents. In this instance, R is a high molecular, saturated or unsaturated alkyl radical with more than six carbon atoms and R' stands for a cycloalkyl, aralkyl or aryl group.

In the aforesaid U. S. Patent No. 2,139,190 R and R' have a different significance. In this case R is hydrogen, an alkyl group with less than six carbon atoms, an aralkyl or an aryl group and R' an alkyl group with less than six carbon atoms, a cycloalkyl, an aralkyl or an aryl group. The choice of the amine reacting with the exchangeable halogen or of the alkylating or aralkylating agent used for the subsequent treatment must, however, be so made that a high molecular, saturated or unsaturated alkyl radical with more than six carbon atoms will be present in the new compound or will be introduced into the latter.

The aforesaid U. S. patent application Ser. No. 188,203 is again differentiated by the fact that R is represented by a higher molecular aryl radical, which may be unsubstituted or substituted, as desired, and R' is represented by hydrogen or an alkyl or aralkyl group.

In the further treatment of this group of amino fatty acid derivatives it was discovered that new compounds with valuable properties are likewise obtained if a halogen fatty acid amide of the type:

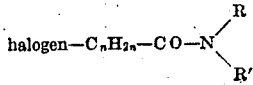

$n=1$, 2 or 3 with easily exchangeable halogen, R representing an unsubstituted or suitably substituted aryl radical, and R' representing hydrogen or an alkyl or aralkyl group, are reacted with the nitrogenous compounds referred to in the aforesaid U. S. patent applications. Ammonia or primary, secondary or tertiary aliphatic, aliphatic-araliphatic, aliphatic-hydroaromatic, aliphatic-aromatic, hydroaromatic, aromatic or cyclic amines are equally suitable for this purpose. These may be substituted by like or unlike substituents and the substituents may themselves be further substituted, for example when alkyl radicals are present they may contain hydroxyl groups and/or halogen atoms. Where primary, secondary or tertiary bases are produced in this way, they may be further treated with the usual unsubstituted or halogen- and/or hydroxyl-substituted, saturated or unsaturated alkylating or aralkylating agents. The new amino fatty acid amides may also be converted into salts of organic or inorganic acids (see the aforesaid patent applications).

The halogen fatty acid amides which are used as the starting materials are, for instance, prepared by reacting halogen fatty acids or suitable derivatives thereof, such as the esters or chlorides, with primary or secondary mono- and polyamines of the type:

wherein R is represented by an unsubstituted aryl radical, or an aryl radical substituted as desired, and R' means hydrogen, an alkyl or an aralkyl group. By way of example there may be cited 2-chloro-1-amino-benzene, 4-chloro-1-ethylamino-benzene, 2:4-dichloro-1-amino-benzene, 2:4-dichloro-1-methylamino-benzene, 2:5-dichloro-1-amino-benzene, 3-chloro-2-methyl-1-amino-benzene, 3:4-dichloro-1-amino-benzene, 2:4:6-trichloro-1-amino-benzene, 5-chloro-2-hydroxy-1-amino-benzene, 1:3-diamino-4-chlorobenzene, 3:4-dichloro-N-(4'-chlorobenzyl)aniline. Where diamines are used in the reaction, one or two molecules of the halogen fatty acids or their derivatives may be used. The reaction of the halogen fatty acid amides so prepared with the amines set forth above is effected by known methods, and with ammonia or primary, secondary or tertiary amines the corresponding primary to quaternary amino fatty acid amides are formed and halogen hydracid is split off. If the amines selected for the reaction are such that primary, secondary or tertiary amino fatty acid amides are formed, the products can be afterwards alkylated or aralkylated to the quaternary substitution degree. This may be effected with the customary alkylating and aralkylating agents such, for example, as the mineral acid esters of saturated or unsaturated alcohols, such as alkyl-, aralkyl- or alkylen-halogenides, halogenhydrins, halogen fatty acids, halogen fatty acid esters, halogen fatty acid amides, dialkyl sulphates, or by adding sulphonic acid esters.

These new nitrogen compounds, with the exception of the quaternary compounds, as bases are insoluble in water. They may be rendered water-soluble by the methods commonly employed for ammonia derivatives. With inorganic or organic acids they form salts, for instance hydrochlorides, sulphates, phosphates, silicofluorates, formates, chloracetates, oxalates, citrates, tartrates.

The new amino fatty acid derivatives can be used for protecting wool, furs, feathers, hairs, leather, paper, natural or artificial fibres, or articles made of or containing these materials against moths and other pests detrimental to wool or woollen goods or to goods of the other materials mentioned. The new water-soluble amino fatty acid derivatives are distinguished from other products previously suggested for similar purposes by their pronounced fastness to milling. By further substitution, or in some cases by suitable reaction with acids or further treatment with alkylating or aralkylating agents, agents for combatting animal pests, such as plant protecting agents, and fungicidal and bactericidal compounds are obtained.

The following examples illustrate the invention, the parts being by weight:

EXAMPLE 1

162 parts of 3:4-dichloraniline are dissolved in 500 parts of benzene and caused to react at 50° C. with 135 parts of chloracetyl-chloride while stirring. A thick paste separates out, which gradually dissolves with an evolution of HCl. After a 12 hours agitation at 50° C., the whole is heated to boiling temperature for one hour, filtered, and after cooling, the precipitated chloracetyl-dichloraniline is sucked off and dried.

23.8 parts of this compound are stirred into 55 parts of a 20% dimethylamine solution at room temperature, and after one hour the whole is heated to 50° C. The reaction is completed when a test portion of the unhomogeneous mixture forms a clear solution in weak hydrochloric acid. After cooling, the reaction mixture, which divides out into a semi-solid and an aqueous layer, is separated and the non-aqueous layer washed with water. In most cases this will solidify spontaneously or after introduction of a crystal nucleus.

10 parts of dimethylaminoacetyl-3:4-dichloraniline and chloracetyl-3:4-dichloraniline are boiled over night in 100 parts of toluene. A white powder is produced and is sucked off, washed with toluene and benzene and dried under reduced pressure. The new compound, which has the probable formula

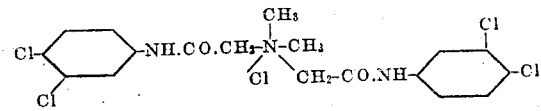

forms a clear solution in water.

EXAMPLE 2

50 parts of dimethylaminoacetyl-3:4-dichloraniline as prepared in Example 1 are stirred with 35 parts of p-chloro-benzyl-chloride in 200 parts of benzene for 12 hours at 60° C. The resulting product which separates out is treated as described above and forms a clear solution in water.

If, in the above examples, 3:4-dichloro-monomethylaniline, a corresponding halogen-benzylated or another of the compounds referred to above is used in place of 3:4-dichloraniline, a material with similar properties is finally obtained.

A range of other compounds which may be made according to the examples is shown in the following table.

TABLE

*Chloro- or bromo-acetylchloride*

| | Is reacted with— | | And the amino acetic acid amide derivative is made quaternary with 1 mol. of— |
|---|---|---|---|
| | (1) 1 mol. of— | (2) 1 mol. of— | |
| 1 | 4-chloro-methylaniline | Dimethylamine | 3:4-dichlorobenzylchloride. |
| 2 | 4'-chlorobenzyl-4-chloraniline | do | Do. |
| 3 | do | do | Chloracetyl-3:4-dichloraniline. |
| 4 | 3:4-dichloraniline | do | Benzylchloride. |
| 5 | do | Diethylamine | 3:4-dichlorobenzylchloride. |
| 6 | do | Piperidine | 4-chlorobenzylchloride. |
| 7 | 3:4-dichlorethylaniline | Dimethylamine | 3:4-dichlorobenzylchloride. |
| 8 | 3:4-dichloraniline | Diethanolamine | 4-chlorobenzylchloride. |
| 9 | do | Diethylamine | Do. |
| 10 | do | Dimethylamine | 3:4-dichlor-ω-chloracetophenone. |
| 11 | do | do | Chloracetyl-4-chloraniline. |
| 12 | do | do | Chloracetyl-4-chlorothiophenol. |
| 13 | do | do | 3:4-dichlorobenzylchloride. |
| 14 | 3:5-dichloraniline | do | 3:5-dichlorobenzylchloride. |
| 15 | 3:4:5-trichloraniline | do | Benzylchloride. |
| | | 2 mols. of— | 2 mols. of— |
| 16 | Di-(4-chlorophenylethylenediamine) | Dimethylamine | 3:4-dichlorobenzylchloride. |
| 17 | do | do | Chloracetyl-3:4-dichloraniline. |

Instead of the chloracetic acid derivatives used in the above example there may be used the corresponding derivatives of chloropropionic acid, chlorobutyric acid, and so on.

The resulting products have in general the same or very similar properties.

Other suitable compounds may be made according to the present process with all other components enumerated in the aforesaid U. S. patent applications.

What we claim is:

1. A process for preparing new quaternary amino-acetic acid amide derivatives, which comprises heating a compound of the type

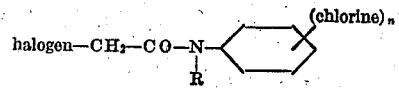

containing easily exchangeable halogen, n=1, 2 and 3, in which R means one of the group consisting of H, lower alkyl and aralkyl radicals, with a nitrogen compound selected from the group consisting of ammonia and primary and secondary aliphatic, alicyclic, araliphatic, aromatic and hydroaromatic amines free from higher alkyl radicals to form by splitting off halogenhydracid, the corresponding aminoacetic acid amide and further alkylating the reaction product up to the quaternary degree with a compound of the formula

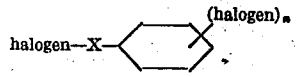

wherein $n$ is 1 to 3 and X means one of the group consisting of —CH$_2$—, —CH$_2$.CO.NH—, —CH$_2$.CO— and —CH$_2$.CO.S—.

2. A process for preparing new quaternary amino-acetic acid amide derivatives, which comprises causing a compound of the type

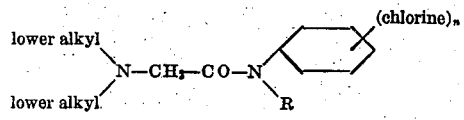

n=1 to 3, in which R means one of the group consisting of H, lower alkyl and aralkyl radicals, to add a compound of the formula

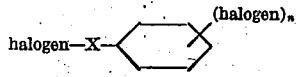

wherein $n$ is 1 to 3 and X means one of the group consisting of

—CH$_2$—, —CH$_2$.CO.NH—, —CH$_2$.CO— and —CH$_2$.CO.S—.

3. A process for preparing a new quaternary amino-acetic acid amide, which comprises heating chloracetyl-3:4-dichloraniline with dimethylamine to form, by splitting off HCl, dimethylaminoacetyl-3:4-dichloraniline and forming the quaternary compound by addition of one molecule of chloracetyl-3:4-dichloraniline in the heat.

4. A process for preparing a new quaternary amino-acetic acid amide which comprises heating chloracetyl-3:4-dichloraniline with dimethylamine to form, by splitting off HCl, dimethylamino-acetyl-3:4-dichloraniline and forming the quaternary compound by addition of one molecule of p-chloro-benzylchloride in the heat.

5. A process for preparing a new quaternary amino-acetic acid amide, which comprises heating chloracetyl-3:4-dichloraniline with dimethylamine to form, by splitting off HCl, dimethylamino-acetyl-3:4-dichloraniline and forming the quarternary compound by addition of one molecule of 3:4-dichlorobenzylchloride in the heat.

6. As new products the quaternary ammonium derivatives of the general formula

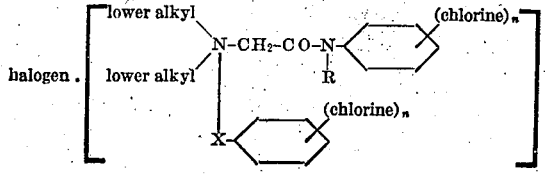

wherein $n$ is 1 to 3, R means one of the group consisting of H, lower alkyl and aralkyl radicals, and X means a member of the group consisting of —CH$_2$—, —CH$_2$.CO.NH—, —CH$_2$.CO— and CH$_2$.CO.S—.

7. As new products the quaternary ammonium derivatives of the general formula

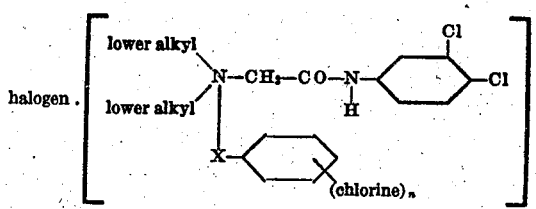

wherein $n$ is 1 to 3, and X means a member of the group consisting of —CH$_2$—, —CH$_2$.CO.NH—, —CH$_2$.CO— and —CH$_2$.CO.S—.

8. As new product the quaternary ammonium derivative of aminoacetic acid amide of the following formula

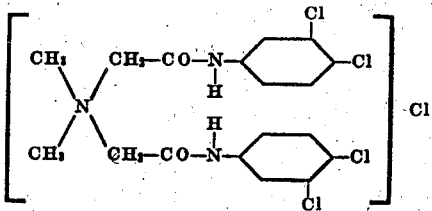

being a white powder, clearly soluble in water and possessing valuable properties for mothproofing textiles and materials liable to damage from moths.

9. As new product the quaternary ammonium derivative of aminoacetic acid amide of the following formula

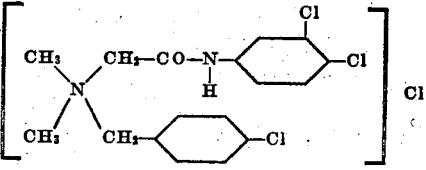

being a white powder, clearly soluble in water and possessing valuable properties for mothproofing textiles and materials liable to damage from moths.

10. As new product the quaternary ammonium derivative of aminoacetic acid amide of the following formula

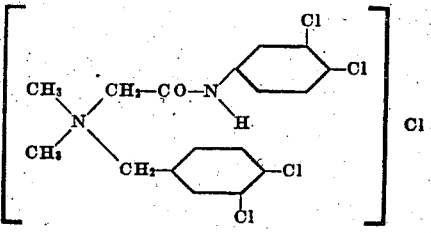

being a white powder, clearly soluble in water and possessing valuable properties for mothproofing textiles and materials liable to damage from moths.

HENRY MARTIN.
KURT GLATTHAAR.
WALTER STAMMBACH.